(12) United States Patent
Nokuo et al.

(10) Patent No.: US 10,471,344 B2
(45) Date of Patent: Nov. 12, 2019

(54) MANIPULATING DEVICE (71) Applicant: Sony Interactive Entertainment Inc., Tokyo (JP)

(72) Inventors: Taichi Nokuo, Tokyo (JP); Isao Okuyama, Chiba (JP); Takeshi Igarashi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 44 days.

(21) Appl. No.: 15/609,375

(22) Filed: May 31, 2017

(65) Prior Publication Data

US 2017/0354873 A1    Dec. 14, 2017

(30) Foreign Application Priority Data

Jun. 10, 2016  (JP) ................. 2016-116242

(51) Int. Cl.
| | |
|---|---|
| A63F 9/24 | (2006.01) |
| A63F 13/00 | (2014.01) |
| G06F 17/00 | (2019.01) |
| G06F 19/00 | (2018.01) |
| A63F 13/245 | (2014.01) |
| A63F 13/211 | (2014.01) |
| A63F 13/213 | (2014.01) |
| A63F 13/837 | (2014.01) |
| G06F 3/02 | (2006.01) |

(Continued)

(52) U.S. Cl.
CPC .......... *A63F 13/245* (2014.09); *A63F 13/211* (2014.09); *A63F 13/213* (2014.09); *A63F 13/24* (2014.09); *A63F 13/837* (2014.09); *A63F 13/98* (2014.09); *G06F 3/02* (2013.01);

*G06F 3/0308* (2013.01); *G06F 3/0338* (2013.01); *A63F 2300/8076* (2013.01)

(58) Field of Classification Search
USPC .................. 463/5, 10, 20, 22, 36, 37, 39
See application file for complete search history.

(56) References Cited

U.S. PATENT DOCUMENTS 4,469,330 A * 9/1984 Asher ................ A63F 13/06
200/6 A
5,459,487 A * 10/1995 Bouton ............... A63F 13/06
345/156

(Continued)

FOREIGN PATENT DOCUMENTS

EP        2446943 A1    5/2012

OTHER PUBLICATIONS

European Search report for corresponding EP Application No. EP17174003, 7 pages, dated Nov. 6, 2017.

*Primary Examiner* — Adetokunbo O Torimiro
(74) *Attorney, Agent, or Firm* — Matthew B. Dernier, Esq.

(57) ABSTRACT

A manipulating device includes an analog manipulator tiltable or slidable in a first direction perpendicular to a central line along a second direction, and a plurality of manipulating buttons disposed in surrounding relation to the analog manipulator. The manipulating buttons include a first manipulating button positioned off the central line in the first direction. The analog manipulator is tilted or slid in the first direction, a position of an upper end of the first manipulating button along the second direction is higher than a position of an outer edge of the analog manipulator which is closer to the first manipulating button, along the second direction.

9 Claims, 8 Drawing Sheets

(51) Int. Cl.
*G06F 3/0338* (2013.01)
*A63F 13/24* (2014.01)
*A63F 13/98* (2014.01)
*G06F 3/03* (2006.01)

(56) References Cited

U.S. PATENT DOCUMENTS

| | | | | |
|---|---|---|---|---|
| 6,102,802 | A | * | 8/2000 | Armstrong ............. A63F 13/06 463/37 |
| 2007/0249422 | A1 | | 10/2007 | Podoloff |
| 2008/0015017 | A1 | * | 1/2008 | Ashida .................... A63F 13/02 463/37 |
| 2014/0102869 | A1 | | 4/2014 | Morita |
| 2014/0171201 | A1 | | 6/2014 | May |

* cited by examiner

MANIPULATING DEVICE

BACKGROUND

The present disclosure relates to a manipulating device.

Some manipulating devices for manipulating game machines and radio-controlled machines such as toy cars, toy boats, and small-size drones, for example, have an analog manipulator that can be tilted or slid in radial directions and a plurality of buttons. U.S. Patent Application Publication No. 2014/0102869 discloses a manipulating device having two analog manipulators. The disclosed manipulating device also has four buttons positioned at respective four ends of a crisscross pattern, i.e., a directional keypad, provided forwardly of the right analog manipulator, and another directional keypad provided forwardly of the left analog manipulator.

SUMMARY

While the user of a game machine or a radio-controlled machine is manipulating the machine with a manipulating device, the user may be in a situation where they need to actuate a button after actuating an analog manipulator or to actuate an analog manipulator after actuating a button. If the user is able to actuate an analog manipulator and a button smoothly in succession, i.e., one after another, then the operability of the game machine or the like will be improved significantly.

There is a need for the present disclosure to provide a manipulating device having an analog manipulator and a plurality of manipulating buttons which can be actuated smoothly in succession.

According to an embodiment of the present disclosure, there is provided a manipulating device including an analog manipulator tiltable or slidable in a second direction perpendicular to a central line along a first direction, and a plurality of manipulating buttons disposed in surrounding relation to the analog manipulator. The manipulating buttons include a first manipulating button positioned off the central line in the second direction, and when the analog manipulator is tilted or slid in the second direction, a position of an upper end of the first manipulating button along the first direction is higher than a position of an outer edge of the analog manipulator which is closer to the first manipulating button, along the first direction.

The manipulating device thus constructed allows the analog manipulator and the manipulating buttons to be actuated smoothly in succession, i.e. one after another.

DETAILED DESCRIPTION OF THE PREFERRED EMBODIMENT

Figure 1:
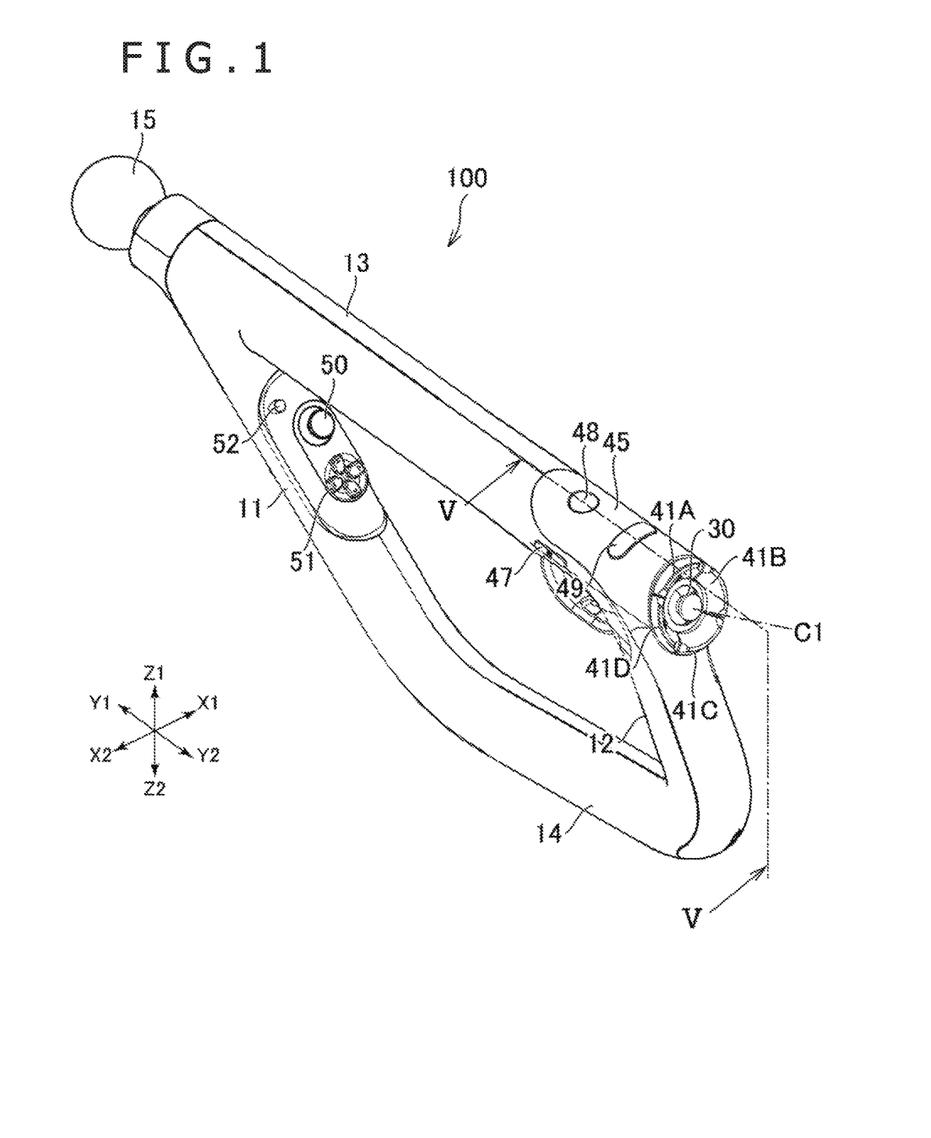
FIG. 1 is a perspective view of a manipulating device according to an embodiment of the present disclosure.
Figure 2:
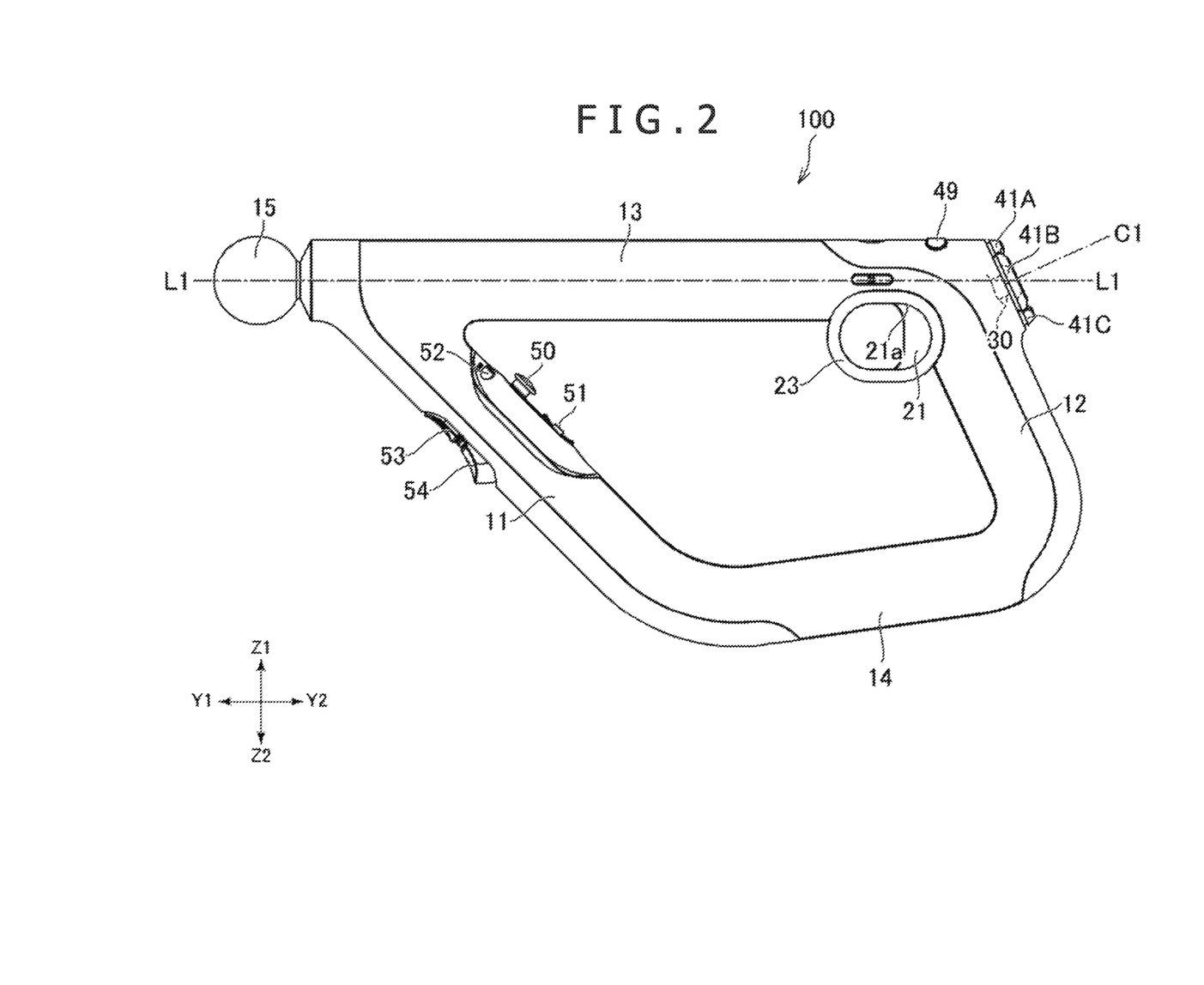
FIG. 2 is a side elevational view of the manipulating device shown in FIG. 1.

A manipulating device according to an embodiment of the present disclosure will be described below with reference to FIGS. 1 through 7. FIG. 1 shows in perspective a manipulating device 100 according to the embodiment of the present disclosure. FIG. 2 shows the manipulating device 100 in side elevation. In the description which follows, directions Y1 and Y2 shown in FIG. 1 will be referred to as forward and rearward directions, respectively, directions Z1 and Z2 as upward and downward directions, respectively, and directions X1 and X2 as rightward and leftward directions, respectively.

As shown in FIG. 1, the manipulating device 100 includes grips 11 and 12 to be gripped by the user. Specifically, the manipulating device 100 according to the illustrated embodiment includes a rear grip 12 and a front grip 11 spaced forwardly from the rear grip 12. The manipulating device 100 also includes a rod-shaped upper elongate member 13 extending along the forward and rearward directions. The upper elongate member 13 is connected to the upper ends of the front and rear grips 11 and 12. Specifically, the front grip 11 is connected to the front end of the upper elongate member 13, whereas the rear grip 12 is connected to the rear end of the upper elongate member 13. As shown in FIG. 2, the front grip 11 extends downwardly from the upper elongate member 13 and obliquely rearwardly. The rear grip 12 extends downwardly from the rear end of the upper elongate member 13 and obliquely rearwardly. In the manipulating device 100, the front grip 11 is inclined at a greater gradient than the rear grip 12 such that the distance between the front grip 11 and the rear grip 12 is progressively smaller along the downward direction. The manipulating device 100 further includes a lower elongate member 14 interconnecting the lower end of the front grip 11 and the lower end of the rear grip 12.

As described in detail later, the manipulating device 100 serves as a game controller that is used to manipulate a game machine. When the manipulating device 100 is in use, the user grips the front grip 11 with one hand and grips the rear grip 12 with the other hand, and orients the front end of the elongate member 13 in the forward direction. The manipulating device 100, which is a controller that simulates a gun, includes a trigger 21 as shown in FIG. 2. The trigger 21 is positioned between the uppermost portion of the rear grip 12 and the rearmost portion of the upper elongate member 13. The user can place a finger on the trigger 21 while gripping the rear grip 12.

The manipulating device 100 is not limited to the configuration shown in FIGS. 1 and 2, but may be modified in various ways. For example, the manipulating device 100 may have one grip. The manipulating device 100 may not include the lower elongate member 14. The lower end of the front grip 11 may be separate from the lower end of the rear grip 12. Alternatively, the lower end of the front grip 11 may be directly connected to the lower end of the rear grip 12, so that the manipulating device 100 may be of a triangular shape as a whole.

As shown in FIG. 1, the manipulating device 100 includes an analog manipulator 30. The analog manipulator 30 can be tilted or slid along directions perpendicular to a central line C1, i.e., in radial directions of the analog manipulator 30. The central line C1 represents the central axis of a manipulator and button assembly. Depending on the distance that the analog manipulator 30 has moved, i.e., the distance that the analog manipulator 30 has slid from the central line C1 or the angle through which the analog manipulator 30 has been tilted from the central line C1, and also on the direction along which the analog manipulator 30 has moved, a signal is generated and output from a support mechanism 31 through a circuit board 33 to be described later.

Figure 3:
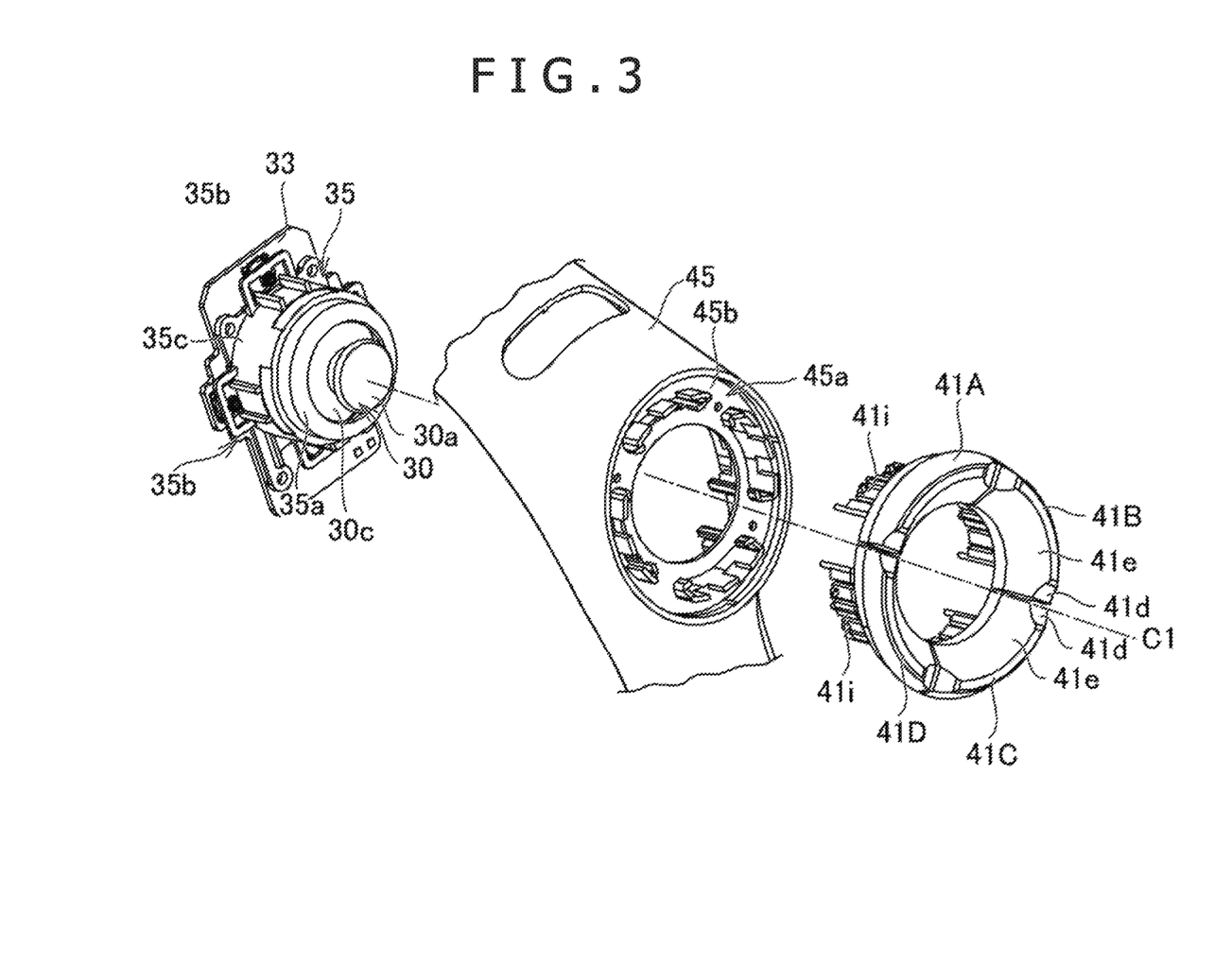
FIG. 3 is an exploded perspective view of an analog manipulator, manipulating buttons, and other members on the manipulating device shown in FIG. 1.
Figure 4:
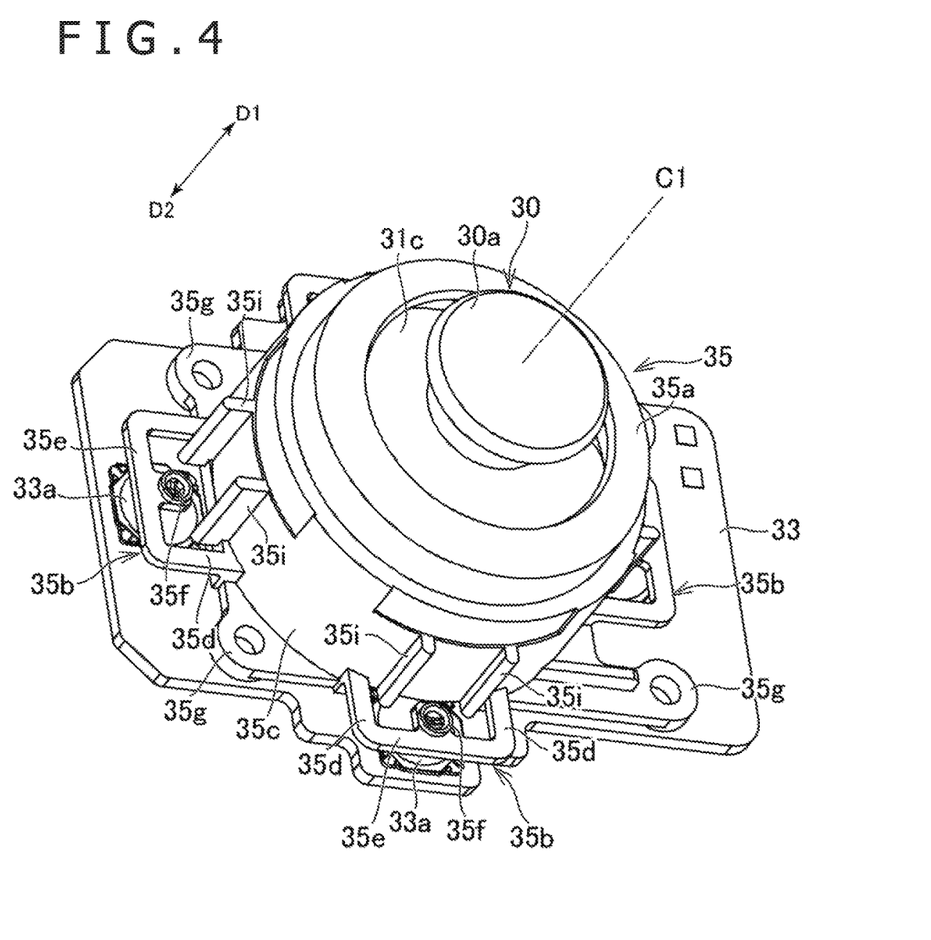
FIG. 4 is an enlarged perspective view of a circuit board and members mounted thereon around the analog manipulator shown in FIG. 3.
Figure 5:
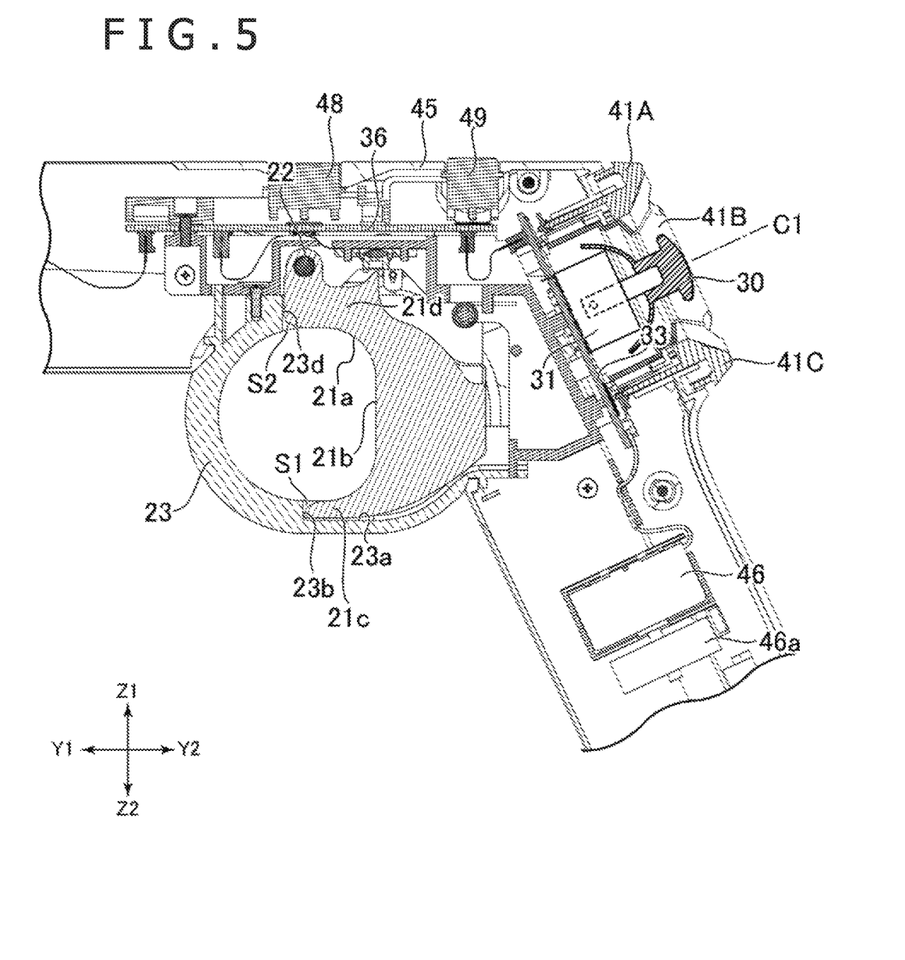
FIG. 5 is a cross-sectional view of the manipulating device taken along line V-V of FIG. 1.
Figure 6A:
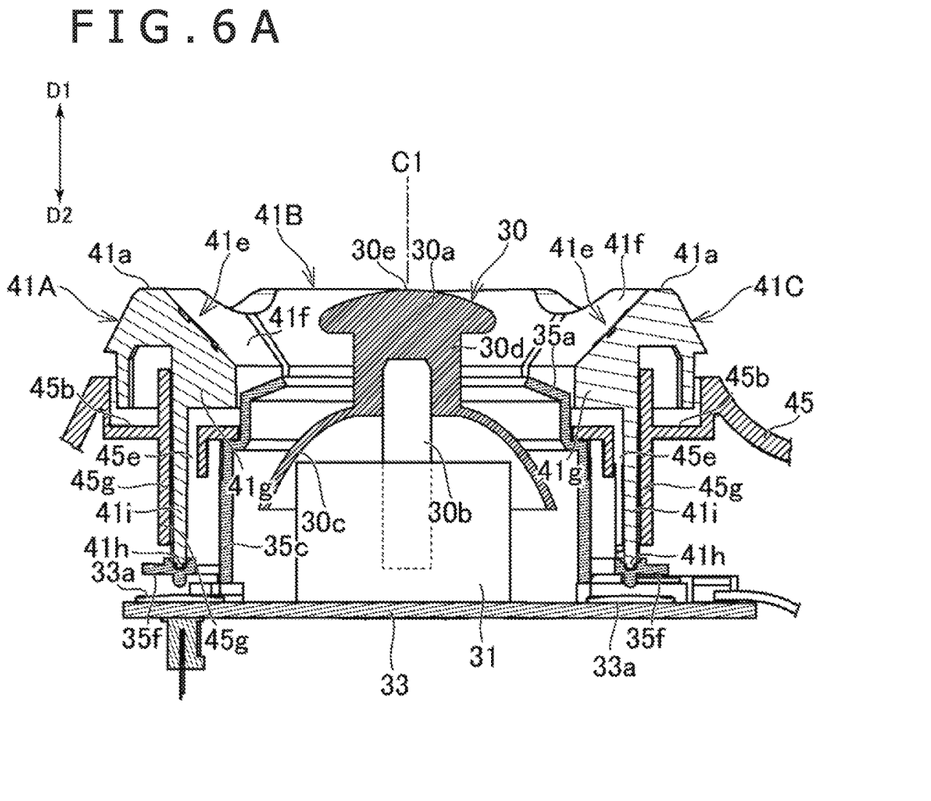
FIG. 6A is a cross-sectional view of the analog manipulator shown in FIG. 5.
Figure 6B:
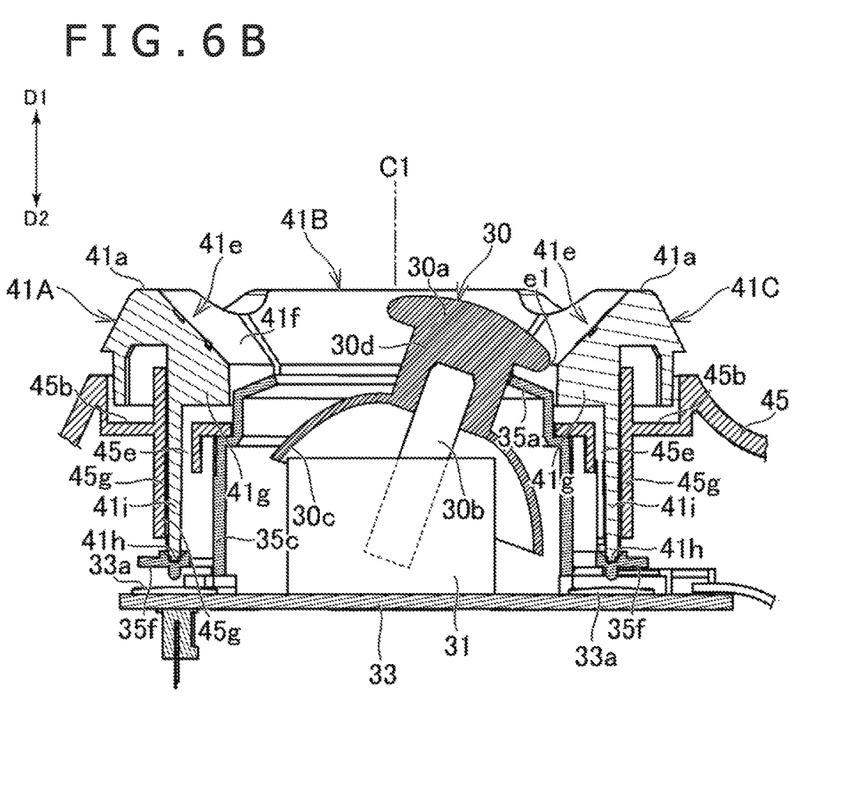
FIG. 6B is a cross-sectional view of the analog manipulator shown in FIG. 6A, the analog manipulator being illustrated as tilted.

FIG. 3 shows in exploded perspective the analog manipulator 30, manipulating buttons 41A to 41D, and other members on the manipulating device 100. FIG. 4 shows in enlarged perspective the circuit board 33 and members mounted thereon around the analog manipulator 30 shown in FIG. 3. FIG. 5 shows the manipulating device 100 in cross section taken along line V-V of FIG. 1. FIGS. 6A and 6B show the analog manipulator 30 in cross section. In FIG. 6A, the analog manipulator 30 is shown as being positioned in alignment with the central line C1, i.e., in its initial position. In FIG. 6B, the analog manipulator 30 is shown as being tilted in a radial direction from the central line C1. In the following description, directions D1 and D2 shown in FIGS. 4, 6A, and 6B, i.e., directions along the central line C1, will be referred to as upward and downward directions, respectively.

As shown in FIGS. 4 and 6A, the analog manipulator 30 includes a disk-shaped upper portion 30a that can be touched by a user's finger and a post 30b extending from the upper portion 30a to the support mechanism 31 and supported by the support mechanism 31. The support mechanism 31 is mounted on the circuit board 33. As shown in FIG. 6B, the post 30b of the analog manipulator 30 has a lower end pivotally supported by the support mechanism 31 so that the analog manipulator 30 can be tilted in radial directions. Specifically, the analog manipulator 30 is tiltable in any directions perpendicular to the central line C1, e.g., forward, rearward, rightward, and rearward directions. Alternatively, the support mechanism 31 may support the analog manipulator 30 in a manner to allow the analog manipulator 30 to slide in directions perpendicular to the central line C1.

As shown in FIGS. 4 and 6A, the analog manipulator 30 includes a cover 30c positioned below the upper portion 30a, i.e., on one side of the upper portion 30a which is closer to the support mechanism 31 and the circuit board 33. The analog manipulator 30 also includes a trunk 30d disposed contiguously beneath the upper portion 30a and smaller in diameter than the upper portion 30a. The cover 30c extends radially outwardly from the lower end of the trunk 30d and covers the support mechanism 31 as viewed in the direction of the central line C1.

As shown in FIG. 1, the manipulating device 100 includes a plurality of (four in the illustrated embodiment) manipulating buttons 41A, 41B, 41C, and 41D disposed in surrounding relation to the analog manipulator 30. This layout of the manipulating buttons 41A, 41B, 41C, and 41D allows the analog manipulator 30 and the manipulating buttons 41A, 41B, 41C, and 41D to be actuated smoothly in succession, i.e., one after another. In the illustrated embodiment, the four manipulating buttons 41A, 41B, 41C, and 41D are disposed around the analog manipulator 30. Each of the four manipulating buttons 41A, 41B, 41C, and 41D may include a push button. As long as there is no need to distinguish the four manipulating buttons 41A, 41B, 41C, and 41D from each other, they will hereinafter be collectively referred to as manipulating buttons 41. When the analog manipulator 30 is viewed along the central line C1, the four manipulating buttons 41 are positioned respectively on the upper, lower, right, and left sides of the analog manipulator 30. The number of manipulating buttons 41 is not limited to four, but may be three, two, or more than four, for example.

As shown in FIG. 6B, when the analog manipulator 30 is tilted in a direction perpendicular to the central line C1, i.e., in a radial direction from the central line C1, an outer edge e1 of the analog manipulator 30 is brought closely to one of the manipulating buttons 41, i.e., the manipulating button 41 that is positioned in the direction along which the analog manipulator 30 is tilted. The manipulating buttons 41 are formed so as to project upwardly. When the analog manipulator 30 is tilted until it abuts against a stop 35a to be described later, the position of an upper end 41a of the manipulating button 41 along the central line C1 is higher than the outer edge of the analog manipulator 30 along the central line C1, i.e., the outer edge e1 in the direction along which the analog manipulator 30 is tilted. This positional relationship between the manipulating button 41 and the analog manipulator 30 is effective to prevent the analog manipulator 30 from presenting an obstacle to a user's finger action to actuate the manipulating button 41. Consequently, it is possible to allow the analog manipulator 30 and the manipulating button 41 to be actuated smoothly in succession.

When the analog manipulator 30 is positioned in alignment with the central line C1, i.e., in its initial position, as shown in FIG. 6A, the positions of the upper ends 41a of plural of the manipulating buttons 41 along the central line C1 are higher than the outer edge of the analog manipulator 30 along the central line C1. More specifically, the position of the outer edge of the upper portion 30a of the analog manipulator 30 is lower than the positions of the upper ends 41a of the manipulating buttons 41. This positional relationship between the manipulating button 41 and the analog manipulator 30 is more effective to prevent the analog manipulator 30 from presenting an obstacle to a user's finger action to actuate the manipulating buttons 41.

When the analog manipulator 30 is in its initial position, as shown in FIG. 6A, the upper portion 30a of the analog manipulator 30 has an uppermost surface 30e positioned at the same height as the upper ends 41a of the manipulating buttons 41. Consequently, when the manipulating device 100 is not in use, for example, the manipulating buttons 41 prevent lateral external forces from acting on the upper portion 30a of the analog manipulator 30. Alternatively, the uppermost surface 30e of the upper portion 30a may be higher than or lower than the upper ends 41a of the manipulating buttons 41.

As shown in FIG. 3, the manipulating buttons 41 that surround the analog manipulator 30 are arranged in an annular pattern as a whole. With the manipulating buttons 41 being thus ring-shaped, either one of the manipulating buttons 41 is positioned at all times in any of the radial directions as viewed from the analog manipulator 30. Therefore, the user finds it easy to actuate any one of the manipulating buttons 41 in succession after actuating the analog manipulator 30.

As shown in FIG. 3, each of the manipulating buttons 41 is of an arcuate shape extending around the central line C1. The arcuate shape of the manipulating buttons 41 allows them to be long enough circumferentially around the central line C1. As a result, the user is able to press the manipulating buttons 41 smoothly and reliably. The ends of each of the manipulating buttons 41 along the circumferential directions are disposed in the vicinity of the ends of adjacent manipulating buttons 41. More specifically, the distance between the facing ends of adjacent two manipulating buttons 41 is smaller than the length of each of the manipulating buttons 41.

Each of the manipulating buttons 41 is not limited to the arcuate shape according to the illustrated embodiment, but may be of a round shape. Each of the round manipulating buttons 41 may be spaced from adjacent manipulating buttons 41. The manipulating buttons 41 may be arranged in a quadrangular or triangular pattern as a whole. The manipulating buttons 41 in the illustrated embodiment have the same size. However, the manipulating buttons 41 may not necessarily be of the same size. Any of the manipulating buttons 41 which are considered to be used highly frequently may be longer than the other manipulating buttons 41 along the circumferential directions around the central line C1.

As shown in FIG. 6A, the manipulating buttons 41 have respective inner peripheral surfaces 41e that jointly surround the upper portion 30a of the analog manipulator 30. The inner peripheral surfaces 41e include respective slanting surfaces 41f that extend progressively closer to the analog manipulator 30 along the downward direction from the upper ends 41a of the manipulating buttons 41 toward the circuit board 33. With the manipulating buttons 41 being thus shaped, the upper portion 30a of the analog manipulator 30 is prevented from hitting any of the inner peripheral surfaces 41e of the manipulating buttons 41 when the analog manipulator 30 is tilted. Furthermore, as the inner peripheral surfaces 41e have their lower edges positioned closer to the analog manipulator 30, the stop 35a is less liable to be visible.

Each of the manipulating buttons 41 may have recess or projection surfaces on its portions bordering adjacent manipulating buttons 41. The user can easily distinguish two adjacent manipulating buttons 41 by feeling their recess or projection surfaces with a finger. As shown in FIG. 3, the upper surface of each of the manipulating buttons 41 of the illustrated manipulating device 100 includes recess surfaces 41d on its end portions.

As shown in FIGS. 6A and 6B, the stop 35a of the manipulating device 100 serves to define the maximum displacement (maximum angle of tilt) of the analog manipulator 30. The stop 35a extends from a position beneath the lower edge of the inner peripheral surfaces 41e of the manipulating buttons 41 radially inwardly toward the analog manipulator 30. The stop 35a surrounds the analog manipulator 30 as it is viewed along the central line C1. The analog manipulator 30 can be tilted radially outwardly about the lower end of the post 30b that is pivotally supported by the support mechanism 31, until the trunk 30a abuts against the stop 35a. When the analog manipulator 30 is tilted radially outwardly until the trunk 30d abuts against the stop 35a, the upper portion 30a of the analog manipulator 30 stays clear of the inner peripheral surfaces 41e of the manipulating buttons 41.

As shown in FIG. 6A, the manipulating device 100 includes the circuit board 33, and the support mechanism 31 is disposed on the circuit board 33. The circuit board 33 supports a plurality of switches 33a (see FIG. 4) installed thereon at respective positions below the manipulating buttons 41. Specifically, the circuit board 33 supports thereon four switches 33a positioned in alignment with the respective manipulating buttons 41. The four switches 33a are positioned individually on the upper, lower, right, and left sides of the support mechanism 31. Each of the switches 33a includes a membrane switch, though it may be another switch such as a tact switch, for example.

As shown in FIG. 6A, each of the manipulating buttons 41 has an upper portion 41g including the inner peripheral surface 41e and a lower portion 41i (see also FIG. 3) extending downwardly from the upper portion 41g. Downwardly from the lower end of the lower portion 41i, there projects a pusher 41h for pushing the corresponding switch 33a. As shown in FIG. 4, the manipulating device 100 includes a plurality of springs 35b for returning the respective manipulating buttons 41 that have been pushed to their initial positions. Each of the springs 35b includes a leaf spring. According to the illustrated embodiment, the springs 35b and the stop 35a are integrally formed with each other. The number of parts that make up the manipulating device 100 is thus reduced. The springs 35b and the stop 35a may be made of resin.

As shown in FIG. 4, the manipulating device 100 includes an assembly 35 that includes the springs 35b and the stop 35a. The assembly 35 will hereinafter be referred to as "stop assembly 35." In the illustrated embodiment, the stop assembly 35 includes a tube 35c extending downwardly from the outer circumferential edge of the stop 35a and surrounding the support mechanism 31. The springs 35b are formed on the lower edge of the tube 35c. Since the manipulating device 100 has the four manipulating buttons 41, the stop assembly 35 includes four springs 35b associated respectively with the four manipulating buttons 41. The springs 35b project radially outwardly from the lower edge of the tube 35c.

As shown in FIG. 4, the stop assembly 35 is fastened to the circuit board 33 by fasteners such as screws or the like. In the illustrated embodiment, the stop assembly 35 includes a plurality of lugs 35g projecting from the lower edge of the tube 35c. The lugs 35g are fixed to the circuit board 33 by fasteners such as screws or the like.

As shown in FIG. 4, the springs 35b are positioned above the switches 33a. The pushers 41h (FIG. 6A) of the manipulating buttons 41 are positioned above the springs 35b. When the manipulating buttons 41 are pushed down, the pushers 41h push the switches 33a through the springs 35b. As described above, the stop assembly 35 is fastened to the circuit board 33 by fasteners such as screws or the like. Therefore, even if the switches 33a and the manipulating buttons 41 are positionally displaced out of alignment with each other, since the manipulating buttons 41 push the switches 33a through the springs 35b, the switches 33a are pushed at appropriate positions therefor by the pushers 41h through the springs 35b.

As shown in FIG. 4, each of the springs 35b includes two arms 35d projecting radially outwardly from the lower edge of the tube 35c, a joint 35e interconnecting the outer ends of the two arms 35d, and a rest 35f projecting from the joint 35e toward the tube 35c. The pusher 41h of one of the manipulating buttons 41 is positioned on the rest 35f, as shown in FIG. 6A. When the user presses one of the manipulating buttons 41, the pusher 41h thereof pushes the corresponding switch 33a through the rest 35f. The rest 35f has a recess defined in an upper surface thereof, and the pusher 41h has a lower end fitted in the recess. The rest 35f and the pusher 41h are thus held in alignment with each other against positional displacement. The springs 35b and the manipulating buttons 41 are not limited to the illustrated structures and shapes, but may be changed in structure and shape. For example, the manipulating buttons 41 may be constructed such that they push the corresponding switches 33a directly.

As shown in FIG. 1, the manipulating device 100 includes a cover 45 serving as part of its outer casing and covering the circuit board 33. The manipulating buttons 41 are mounted on the cover 45. According to the illustrated embodiment, the cover 45 has a circular cavity 45a (see FIG. 3) defined therein in which the manipulating buttons 41 are disposed, and an inner circumferential ledge 45b projecting radially inwardly into the cavity 45a. The manipulating buttons 41 are supported on the inner circumferential ledge 45b. Specifically, as shown in FIG. 6A, the inner circumferential ledge 45b has an attachment hole 45e defined therein in which the lower portions 41i of the manipulating buttons 41 are fitted. The cover 45 includes a wall 45g extending downwardly from an edge of the inner circumferential edge 45b which defines the attachment hole 45e. The lower portion 41i has pawls, not shown, on its lower end which engage the lower edge of the wall 45g, locking the manipulating buttons 41 in place against upward dislodgement off the cover 45.

As shown in FIG. 4, the tube 35c of the stop assembly 35 has a plurality of rib-shaped axial guides 35i on an outer circumferential surface thereof. The lower portions 41i of the manipulating buttons 41 are guided by the guides 35i to prevent the manipulating buttons 41 from being positionally displaced circumferentially around the central line C1.

As shown in FIG. 1, the analog manipulator 30 and the manipulating buttons 41 are disposed on the rear side of an uppermost portion of the rear grip 12. The analog manipulator 30 is arranged such that the central line C1 thereof is oriented rearwardly and upwardly (see FIG. 2). The trigger 21 is positioned on the front side of the uppermost portion of the rear grip 12. As shown in FIG. 2, the analog manipulator 30 and the manipulating buttons 41 are positionally displaced upwardly from the trigger 21. Specifically, the position of the center of the upper portion 30a of the analog manipulator 30 is higher than the position of the vertical center of the trigger 21. This layout allows the user to operate the analog manipulator 30 and the manipulating buttons 41 with a thumb, for example, while placing a finger on the trigger 21. Stated otherwise, the positions of the analog manipulator 30 and the manipulating buttons 41 are set in a range accessible by the thumb while a finger, e.g., the index finger, is placed on the trigger 21. In the illustrated embodiment, the position of the center of the upper portion 30a of the analog manipulator 30 is higher than the upper end 21a (see FIG. 5) of the inner peripheral surface of the trigger 21. On the other hand, the position of the manipulating button 41C which is the lowest among the manipulating buttons 41 is lower than the upper end 21a of the inner peripheral surface of the trigger 21. With this arrangement, the distances between the analog manipulator 30, the manipulating buttons 41, and the trigger 21 are not too large. As a result, the user can smoothly operate the analog manipulator 30 and the manipulating buttons 41 while placing a finger on the trigger 21. As shown in FIG. 5, the circuit board 33 is positioned behind the trigger 21, and is oriented obliquely in alignment with the rear grip 12.

As described above, the manipulating device 100 includes the upper elongate member 13 disposed on the upper portion of the rear grip 12 and extending forwardly therefrom. As shown in FIG. 2, a light emitter 15 is mounted on the front end of the upper elongate member 13. In the illustrated embodiment, the light emitter 15 is of a generally spherical shape. When the manipulating device 100 is in use, an information processing device which serves as the game machine recognizes the position of the light emitter 15 through a camera. The analog manipulator 30 and the manipulating buttons 41 are positioned rearwardly of the light emitter 15. Specifically, when the manipulating device 100 is viewed in side elevation, a horizontal line L1 that extends through the light emitter 15 extends through the analog manipulator 30. More specifically, the horizontal line L1 extends through the upper portion 30a of the analog manipulator 30. This positional relationship between the analog manipulator 30 and the light emitter 15 allows the user to easily recognize the position of the light emitter 15 without seeing the light emitter 15 when the manipulating device 100 is in use. The analog manipulator 30 and the light emitter 15 are not limited to the above positional relationship, but may be positioned differently with respect to each other. For example, the upper portion 30a of the analog manipulator 30 may be positioned higher than the horizontal line L1 or lower than the horizontal line L1.

The trigger 21 is supported so as to be movable rearwardly. In the illustrated embodiment, as shown in FIG. 5, the trigger 21 is pivotally supported on the upper elongate member 13 by a shaft 22 on an upper portion 21d of the trigger 21. The trigger 21 is thus angularly movable rearwardly about the shaft 22. The upper portion 21d of the trigger 21 extends forwardly of a front surface 21b of the trigger 21. The trigger 21 has a lower portion 21c which also extends forwardly of the front surface 21b of the trigger 21. The trigger 21 thus shaped allows the upper surface of the lower portion 21c to support the user's finger, so that the user can operate the trigger 21 comfortably.

As shown in FIG. 5, a guard 23 that is disposed forwardly of the trigger 21 is supported by the upper elongate member 13 and the rear grip 12. The guard 23 and the trigger 21 jointly provide a ring-shaped structure in which the user's finger can be inserted. The guard 23 includes a recess 23a defined in a lower portion thereof, and the lower portion 21c of the trigger 21 is placed in the recess 23a. The guard 23 also includes a stop surface 23b at the front end of the recess 23a. The stop surface 23b is positioned forwardly of the lower portion 21c of the trigger 21 for limiting forward movement of the trigger 21. The lower portion 21c of the trigger 21 has an upper surface extending forwardly and having a front end portion gradually curved downwardly. The curved front end portion of the upper surface of the lower portion 21c of the trigger 21 and the stop surface 23b of the guard 23 jointly define a space or gap S1 therebetween for preventing the user's finger from being caught by the front end of the lower portion 21c of the trigger 21. The guard 23 further includes a stop surface 23d on its upper portion which is positioned forwardly of the upper portion 21d of the trigger 21. The lower surface 21a of the upper portion 21d of the trigger 21 extends forwardly and has a front end portion gradually curved upwardly. The curved front end portion of the lower surface 21a of the upper portion 21d of the trigger 21 and the stop surface 23d of the guard 23 jointly define a space or gap S2 therebetween for preventing the user's finger from being caught by the front end of the upper portion 21d of the trigger 21. The stop surfaces 23b and 23d of the guard 23 may be gradually curved to provide spaces or gaps between themselves and the front ends of the trigger 21.

As shown in FIG. 1, the manipulating device 100 according to the illustrated embodiment also has an analog manipulator 50 on the front grip 11. As with the analog manipulator 30, the analog manipulator 50 is positioned on the rear side of an uppermost portion of the front grip 11 and projects rearwardly. The front grip 11 also supports on its rear side a directional keypad 51 positioned below the analog manipulator 50. Alternatively, instead of the directional keypad 51, a plurality of manipulating buttons may be provided on the front grip 11 in surrounding relation to the analog manipulator 50. If such manipulating buttons are provided on the front grip 11, then the manipulating buttons 41 surrounding the analog manipulator 30 may be dispensed with.

As shown in FIG. 1, in the illustrated embodiment, a manipulating button 52 is disposed on the rear side of the front grip 11 obliquely upwardly of the analog manipulator 50. As shown in FIG. 2, two manipulating buttons 53 and 54 that project forwardly are disposed on the front side of the front grip 11. The manipulating buttons 53 and 54 are arranged in a vertical array. The manipulating buttons 52, 53, and 54 may be arranged in different layouts, and the manipulating device 100 may be free of the manipulating buttons 52, 53, and 54.

As shown in FIG. 1, manipulating buttons 48 and 49 are disposed on the upper side of a rear portion of the upper elongate member 13. As shown in FIG. 5, a circuit board 36 is disposed in the upper elongate member 13 below the manipulating buttons 48 and 49. The circuit board 36 supports switches, not shown, installed thereon which can be pushed individually by the manipulating buttons 48 and 49. In the illustrated embodiment, the manipulating members, i.e., the manipulating buttons 48, 49, and 41 and the analog manipulator 30, are disposed above and behind the trigger 21. As shown in FIG. 1, a manipulating button 47 is disposed on a side surface of the upper elongate member 13. Preferably, two manipulating button 47 are disposed individually on right and left side surfaces of the upper elongate member 13. As shown in FIG. 5, a motor 46 combined with a weight 46a for vibrating the manipulating device 100 is housed in the rear grip 12.

Figure 7:
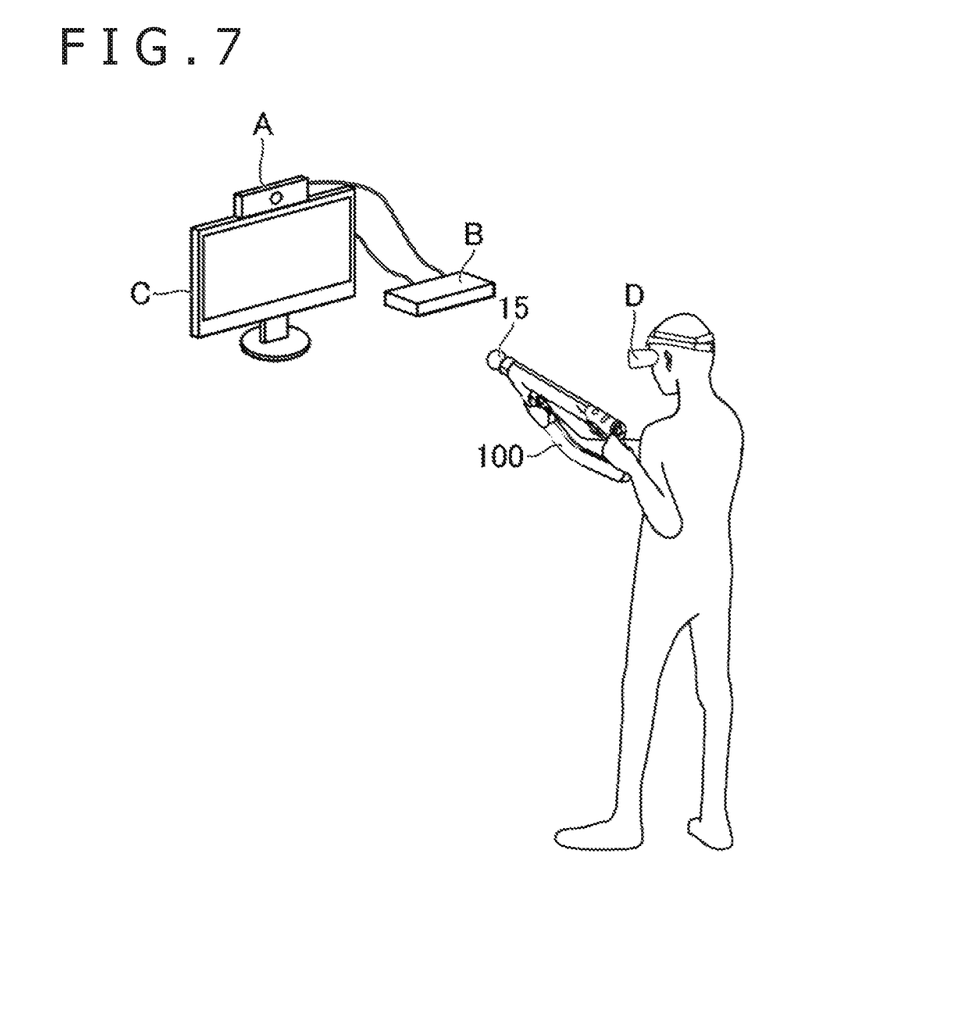
FIG. 7 is a schematic view showing how the manipulating device is used.

FIG. 7 schematically shows how the manipulating device 100 is used. When the manipulating device 100 is in use, the user grips the front grip 11 with one hand and grips the rear grip 12 with the other hand, and orients the light emitter 15 toward a camera A. Video data acquired by the camera A are sent to a game machine B. The manipulating device 100 includes a motion sensor assembly including an acceleration sensor and a gyro sensor, and sends detected signals from those sensors to the game machine B. Using the video data acquired by the camera A and the detected signals from the sensors, the game machine B calculates the position, posture, and motion of the manipulating device 100, and generates video data to be displayed on display devices including a television display C and a head-mounted display D on the head of the user, on the basis of the calculated position, posture, and motion of the manipulating device 100.

As described above, the manipulating device 100 includes the analog manipulator 30 that can be tilted radially and the manipulating buttons 41A, 41B, 41C, and 41D disposed in surrounding relation to the analog manipulator 30. When the analog manipulator 30 is tilted, the positions of the upper ends 41a of the manipulating buttons 41 along the central line C1 is higher than the outer edge of the analog manipulator 30 that is closer to one of the manipulating buttons 41 which is positioned in the direction along which the analog manipulator 30 is tilted. This positional relationship between the manipulating buttons 41 and the analog manipulator 30 is effective to prevent the analog manipulator 30 from presenting an obstacle to a user's finger action to actuate the manipulating buttons 41. Consequently, it is possible to allow the analog manipulator 30 and the manipulating buttons 41 to be actuated smoothly in succession.

The manipulating device 100 includes the upper elongate member 13 disposed on the upper portion of the rear grip 12 and extending forwardly therefrom. The light emitter 15 is mounted on the front end of the upper elongate member 13. The horizontal line L1 that extends through the light emitter 15 extends through the analog manipulator 30. This positional relationship between the analog manipulator 30 and the light emitter 15 allows the user to easily recognize the position of the light emitter 15 without seeing the light emitter 15 when the manipulating device 100 is in use.

The manipulating device 100 includes the trigger 21. The upper surface of the lower portion 21c of the trigger 21 extends forwardly and has the front end portion gradually curved downwardly. The trigger 21 thus shaped is effective to prevent the user's finger from being caught by the front end of the lower portion 21c of the trigger 21. The lower surface 21a of the upper portion 21d of the trigger 21 also extends forwardly and has the front end portion gradually curved upwardly. The trigger 21 thus shaped is effective to prevent the user's finger from being caught by the front end of the upper portion 21d of the trigger 21.

The present disclosure is not limited to the manipulating device 100 described above, but various many changes and modifications may be made therein.

For example, the analog manipulator 30 and the manipulating buttons 41 according to the present disclosure are also applicable to a game controller that is free of the trigger 21.

According to an alternative to the manipulating device 100 in the illustrated embodiment, the analog manipulator 30 may be supported so as to be slidable in directions perpendicular to the central line C1, i.e., in radial directions of the analog manipulator 30.

The manipulating device 100 may not necessarily be provided with the light emitter 15.

The present disclosure contains subject matter related to that disclosed in Japanese Priority Patent Application JP 2016-116242 filed in the Japan Patent Office on Jun. 10, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A manipulating device comprising:
   an analog manipulator tiltable or slidable in a second direction perpendicular to a central line along a first direction; and
   a plurality of manipulating buttons disposed in surrounding relation to the analog manipulator,
   wherein the manipulating buttons include a first manipulating button positioned off the central line in the second direction, and
   when the analog manipulator is tilted or slid in the second direction, a position of an upper end of the first manipulating button along the first direction is higher than a position of an outer edge of the analog manipulator which is closer to the first manipulating button, along the first direction.

2. The manipulating device according to claim 1, wherein when the analog manipulator is positioned on the central line, the positions of the upper ends of the manipulating buttons along the first direction are higher than the position of the outer edge of the analog manipulator, along the first direction.

3. The manipulating device according to claim 1, wherein each of the manipulating buttons is of an arcuate shape extending around the central line.

4. The manipulating device according to claim 3, wherein the manipulating buttons are arranged in an annular pattern as a whole.

5. The manipulating device according to claim 1, wherein each of the manipulating buttons has an inner peripheral surface that extends progressively closer to the analog manipulator from an upper end toward a lower end of the manipulating button.

6. The manipulating device according to claim 1, further comprising:
 a stop surrounding the analog manipulator,
 wherein the analog manipulator stays clear of the manipulating buttons when the analog manipulator is tilted or slid into abutment against the stop.

7. The manipulating device according to claim 6, further comprising:
 a plurality of springs normally urging the stop and the manipulating buttons to initial positions thereof,
 wherein the stop and the springs are integrally formed with each other.

8. The manipulating device according to claim 1, further comprising:
 a grip;
 an elongate member connected to the grip; and
 a trigger positioned between the grip and the elongate member,
 wherein the analog manipulator and the manipulating buttons are disposed on a rear side of the grip or an upper side of the elongate member.

9. The manipulating device according to claim 1, wherein the plurality of manipulating buttons are disposed an encircling relation to the analog manipulator.

* * * * *